United States Patent [19]

Ashby

[11] E Patent Number: Re. 33,139

[45] Reissued Date of Patent: Jan. 2, 1990

[54] PACKING FORM

[75] Inventor: Robert E. Ashby, Quakertown, Pa.

[73] Assignee: Moore Business Forms, Grand Island, N.Y.

[21] Appl. No.: 914,991

[22] Filed: Oct. 3, 1986

Related U.S. Patent Documents

Reissue of:

[64] Patent No.: 4,475,747
Issued: Oct. 9, 1984
Appl. No.: 470,530
Filed: Feb. 28, 1983

[51] Int. Cl.[4] ..... B41L 1/20; B41L 1/26

[52] U.S. Cl. ..... 282/11.5 A; 252/21 R

[58] Field of Search ..... 229/74, 69, 70; 281/45, 281/46, 47, 15 R; 282/11.5 R, 11.5 A, 12 R, 15 R, 21 R, 22 R; 283/79, 80, 81

[56] References Cited

U.S. PATENT DOCUMENTS

| | | | |
|---|---|---|---|
| 3,092,401 | 6/1963 | Steidinger | 282/22 R |
| 3,987,960 | 10/1976 | Gardiner | 282/22 R X |
| 4,123,086 | 10/1978 | FRX | 282/21 R |
| 4,168,851 | 9/1979 | Halse | 282/11.5 A |
| 4,178,018 | 12/1979 | Halse | 282/11.5 A |
| 4,208,066 | 6/1980 | Steidinger | 282/21 R |
| 4,230,262 | 10/1980 | Denay et al. | 229/69 |
| 4,277,089 | 7/1981 | Lockhart | 283/81 X |

FOREIGN PATENT DOCUMENTS

| | | | |
|---|---|---|---|
| 2224999 | 10/1974 | France | 282/11.5 A |
| 2383023 | 6/1978 | France | 282/11.5 A |

*Primary Examiner*—Paul A. Bell
*Attorney, Agent, or Firm*—Cushman, Darby & Cushman

[57] ABSTRACT

A continuous business form assembly provides for computer generated packing slips in adhesive-backed packing envelopes with accompanying packing slip records. A narrow back web with adhesive provides packing slip envelope back panels. A superimposed wide insert web has a non-marginal registry strip inward of a marginal strip, transverse die cuts, and provides product packing slips between snap out perforation lines. A superimposed, narrow front web has a superimposed registry strip, snap perforation lines, and provides packing slip envelope front panels. A narrow adhesive protective web underlies the packing slip envelope back panels, and a wide record web is superimposed on the front web. If desired, feed strips of removed units of the assembly may be left in printer tractors to feed the remainder of the assembly.

7 Claims, 4 Drawing Sheets

PACKING FORM

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to a continuous business form assembly, and more particularly, to such an assembly providing for computer-generated product packing slips in adhesive-backed packing envelopes with accompanying packing slip records.

The term "longitudinal," when used to describe edges, rows or lines, means the edges, rows or lines extend in a longitudinal direction. The term "transverse," when used to describe edges, rows, lines or die cuts, means the edges, rows, lines or the die cuts extend in a transverse direction. The term "superimposed on," when used to describe the physical relationships of edges, rows, or lines, means certain of the edges, rows or lines are physically directly above the other of the edges, rows or lines. The term "superimposed over," when used to describe the relationships of webs, sheets, panels or slips, means certain of the webs, sheets, panels or slips are physically directly above other of the webs, sheets, panels or slips, without regard to whether the edges, lines or die cuts which define the peripheries of the certain webs, sheets, panels, or slips are superimposed on the edges, lines or die cuts which define the peripheries of the other webs, sheets, panels, or slips. The term "marginal," when used to describe the edges, rows or lines of the web or sheet, means the edges, rows or lines are along the longitudinal edges, or margins, of the web or sheet, without regard to whether they are along a margin of the form assembly.

Continuous business form assemblies have been constructed and patented in the past, known as Speediweb TM forms, which include a limited number of sheet thicknesses in the margins. Other forms have been disclosed which include die cuts, and still others which include non-marginal feed strips for collating narrow width webs with wider webs.

An object of this invention is to provide a continuous business form assembly providing for computer-generated product packing slips in packing envelopes.

Another object is to provide such form assemblies with a limited number of sheet thicknesses in the margins.

Yet another object is to provide such form assemblies with the packing slips being readily removable from the envelopes.

A further object is to provide such form assemblies with adhesive-backed packing envelopes.

A still further object is to provide such form assemlies adapted for stacking of the packing envelopes without tenting.

In a principal aspect, the present invention is an improved, continuous business form assembly providing product packing slips in adhesive-backed envelopes, and corresponding records of the packing slips, adapted to be fed through automatic printing means for simultaneous printing of the packing slips of the envelopes, and the corresponding records. The assembly comprises three longitudinally continuous webs, i.e., a back web, an insert web and a front web.

The back web has opposed marginal edges, a transverse width, a marginal row of registry holes along a first of the marginal edges, a front, and longitudinally spaced, transverse lines of perforations extending between the marginal edges. The back web forms product packing slip envelope pack panels.

The insert web is superimposed over the back web, and has opposed marginal edges outward of the back web marginal edges, a transverse width substantially greater than the back web within, and marginal feed strips along the insert web marginal edges. The marginal feed strips include marginal rows of feed holes along the insert web marginal edges and marginal lines of perforations transversely inward of the insert web marginal feed holes. The insert web further has a non-marginal registry strip transversely inward of a first of the insert web marginal feed strips including a non-marginal row of registry holes superimposed on the back web registry holes, and a longitudinal, first non-marginal line of perforations transversely inward of the insert web non-marginal registry holes and one of the back web marginal edges. A longitudinal, second non-marginal line of perforations is located transversely inward of the first non-marginal perforations. A longitudinal, third non-marginal line of perforations is located transversely inward of the second of the back web marginal edges. Longitudinally spaced, transverse die cuts extend between the first insert web marginal perforations and the third non-marginal perforations. The die cuts are superimposed over portions of the back web transverse perforations. Longitudinally spaced, transverse lines of perforations between the insert web marginal edges and the die cuts are superimposed on portions of the back web transverse perforations. The insert web still further has a face and back. It forms product packing slips between the insert web second and third non-marginal perforations and the die cuts, with the slips superimposed over the back web packing slip envelope back panels.

A first set of longitudinal lines of adhesive joins the insert web back to the back web face. One such adhesive line is transversely inward of the third non-marginal perforations. Another such adhesive line is between the first marginal perforations and the first non-marginal perforations.

The front web is superimposed over the insert web, and has opposed marginal edges, a transverse width substantially equal to the first web width, and a marginal row of feed holes along one of the front web marginal edges superimposed on the insert web non-marginal feed holes and the back web feed holes. A marginal line of perforations is located transversely inward of the front web feed holes and transversely outward of the first non-marginal perforations. A longitudinally extending, non-marginal line of perforations is located transversely inward of the front web marginal perforations and superimposed on the second non-marginal perforations of the insert web. The front web further has a face, a back, and longitudinally spaced, transverse lines of perforations superimposed on the back web and insert web transverse perforations. The front web forms product packing slip envelope front panels superimposed over the insert web packing slips and the back web packing slip back panels.

A second set of longitudinal and longitudinally spaced, transverse lines of adhesive joins the front web back to the insert and back web faces. One such longitudinal line is transversely outward of the insert web first non-marginal perforations. Another of such longitudinal adhesive lines is transversely between the insert web first and second non-marginal perforations. A third such longitudinal adhesive line is transversely between the insert web third non-marginal perforations and adjacent edges of the front web. The transverse adhesive lines are longitudinally adjacent in both longitudinal directions the transverse perforations of the back and front webs in the area of the die cuts.

Further objects, features and advantages of the invention are provided in the detailed description which follows.

DETAILED DESCRIPTION OF PREFERRED EMBODIMENT

Figure 1:
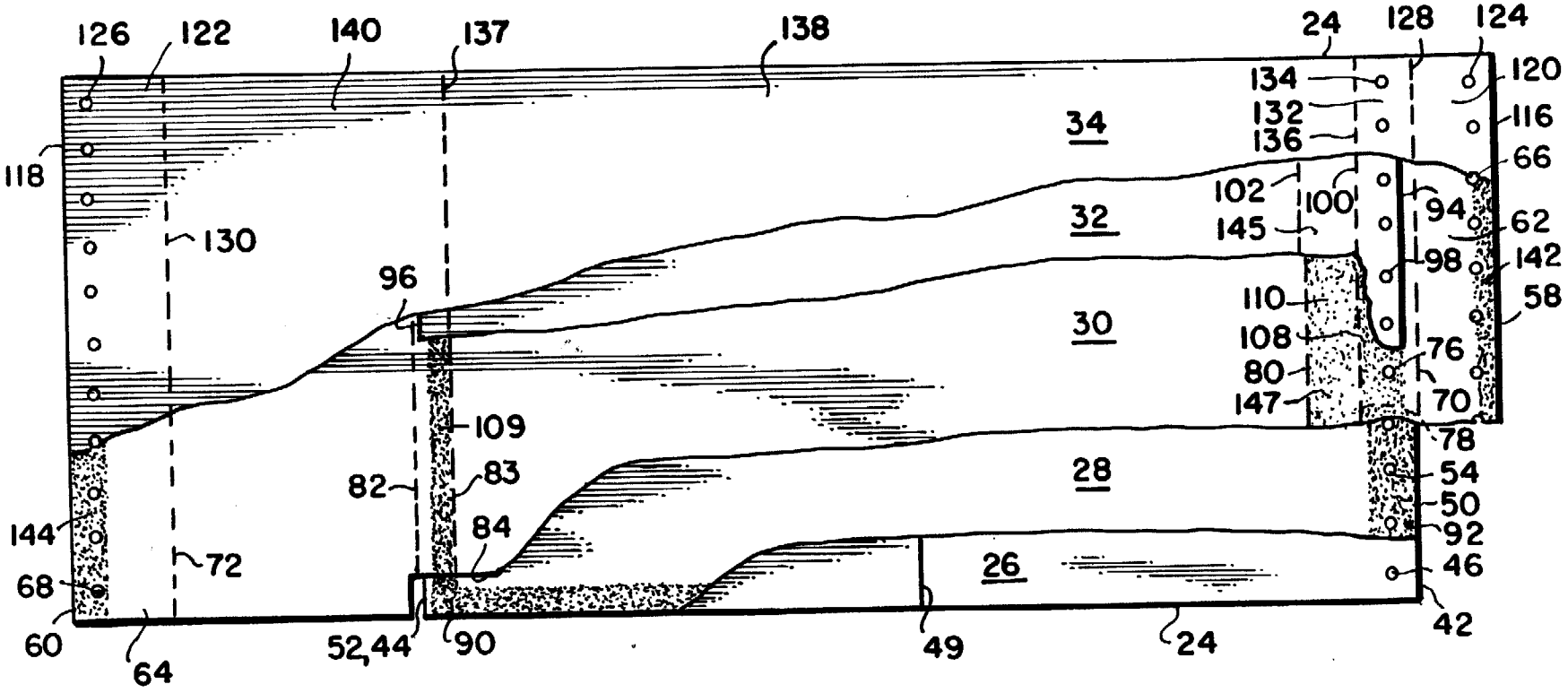
FIG. 1 is a cut-away view of one form of the preferred form assembly.
Figure 4:
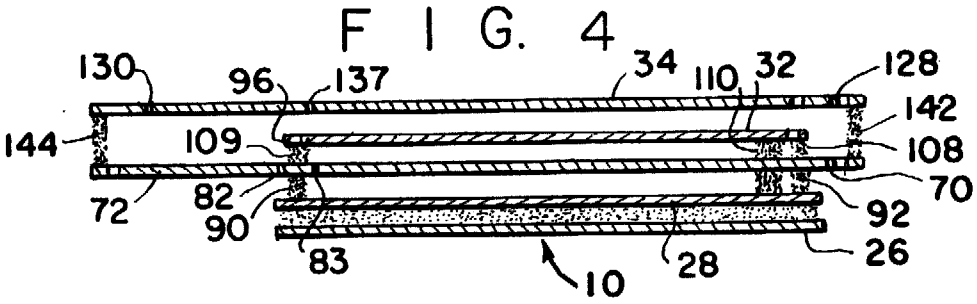
FIG. 4 is a diagrammatic section view of the preferred form assembly taken along line 4—4 of FIG. 2.
Figure 2:
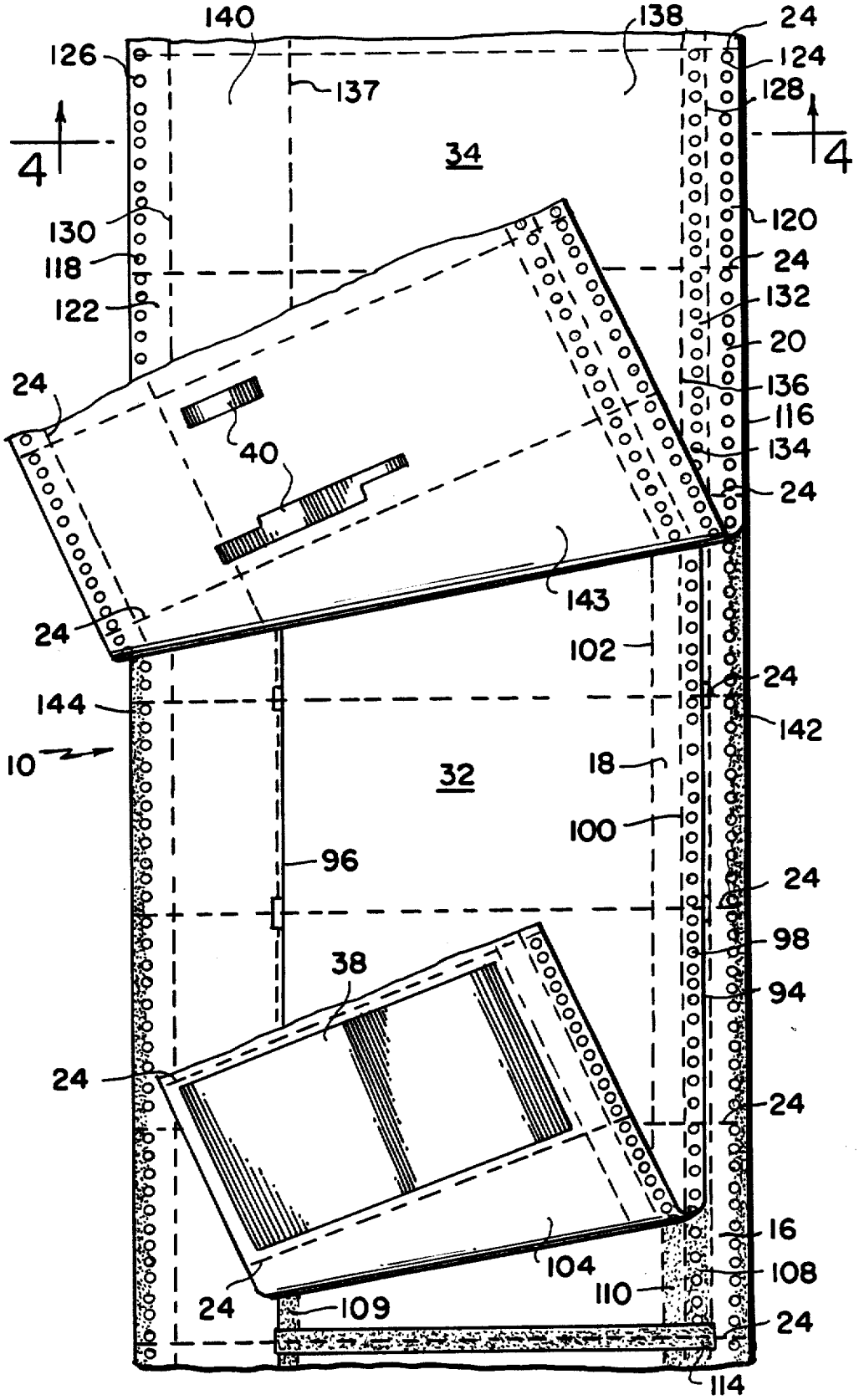
FIGS. 2 and 3 are views together showing the preferred form assembly during assembly thereof.
Figure 3:
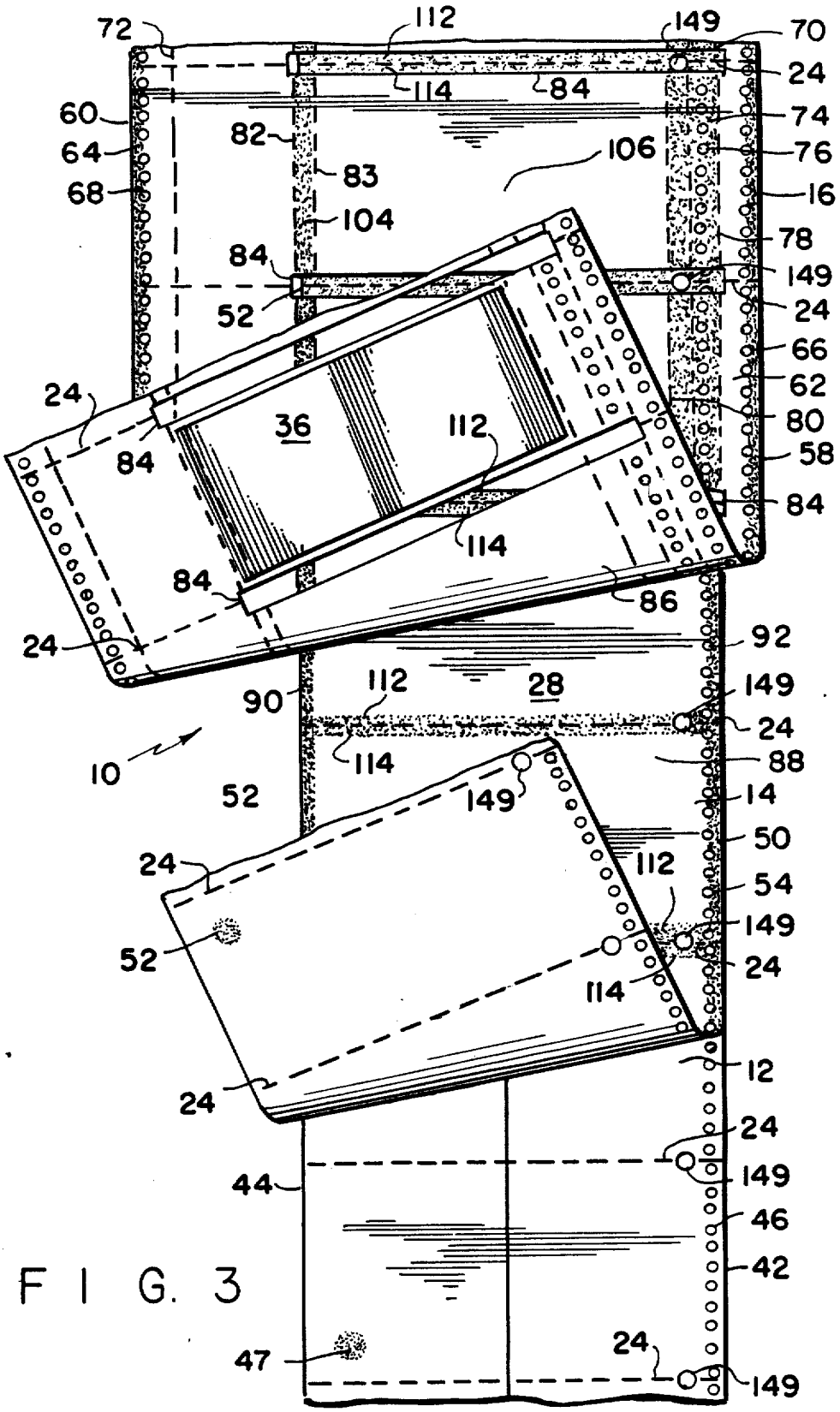

Referring first to FIGS. 2 and 3, a preferred, continuous business form assembly 10 includes a first web 12 shown in FIG. 3, a second web 14 shown in FIG. 3, a third web 16 shown in FIGS. 2 and 3, a fourth web 18 shown in FIG. 2 and a fifth web 20 shown in FIG. 2. The webs 12, 14, 16, 18 and 20 are superimposed in numbered order over each other, and each includes a series of longitudinally spaced, transverse lines of perforations 24 superimposed on the other transverse perforations 24 of the other webs. Thus, form assembly 10 defines series of identical form units, such as form unit 21 in FIG. 1.

Referring now to FIG. 1–3, the first web 12 forms first sheets 26, the second web 14 forms second sheets 28, the third web 16 forms third sheets 30, the fourth web 18 forms fourth sheets 32, and the fifth web 20 forms fifth sheets 34. The sheets 26, 28, 30, 32, 34 are rectangular. Sheets 30 and 34 are of the same size, and sheets 26, 28, 32 are of substantially the same size.

The first web 12 is an adhesive protective web with sheets 26 formed of a release, adhesive protective material. The second web 14 is a back web, with sheets 28 being product packing slip envelope back panels. The third web 16 is an insert web, with sheets 30 including product packing slips. The fourth web 18 is a front web. Sheets 32 are product packing slip envelop front panels. Finally, the fifth web 20 is a record web, with sheets 34 forming one or more records of the packing slips. As shown in FIGS. 2 and 3, the backs of the sheets 30, 32, 34 have areas 36, 38, 40, respectively, of carbonized copy coatings as desired, for simultaneous, computerized or manual imprinting of the records, packing slips and envelope back panels.

The first web 12 is continuous in the longitudinal direction, and has opposed, longitudinal, marginal edges 42, 44. A longitudinal row of registry holes 46 is along the first marginal edge 42. The adhesive release material [costs] *coats* the face 48 of the web 12. A longitudinal cut line 49 is at the center of the sheets 26.

The second web 14 is also longitudinally continuous, and is superimposed over the first web 12. The second web 14 has opposed, longitudinal, marginal edges 50, 52 superimposed, respectively, on the first web marginal edges 42, 44. The transverse widths of the two webs 12, 14 are substantially equal. A longitudinal row of registry holes 54 is along the first marginal edge 50 of the second web 14 superimposed on the first web registry holes 46. An adhesive material coats the back 56 of the second web 14. The back 56 is superimposed on the face 48 of the first web 12. The adhesive release material protects the adhesive on the back 56.

The third web 16 is also longitudinally continuous, and is superimposed over the second web 11. The third web 16 has opposed, marginal edges 58, 60 outward of the first and second web marginal edges 42, 44, 50, 52. The transverse width of the third web 16 is substantially greater than the width of the first and second webs 12, 14. Longitudinally, marginal, removable, feed strips 62, 64 are along the third web marginal edges 58, 60. The strips 62, 64 include, respectively, longitudinal, marginal rows of feed holes 66, 68 along the third web marginal edges 58, 60. The strips 62, 64 also include, respectively, longitudinal, marginal lines of perforations 70, 72 transversely inward of the third web marginal feed holes 66, 68.

A longitudinal, non-marginal, registry strip 74 is located transversely inward of the first, third web marginal feed strip 62. The strip 74 includes a longitudinal, non-marginal, row of registry holes 76 superimposed on the first and second web registry holes 46, 54. The strip 74 further includes a longitudinal, first non-marginal line of perforations 78 transversely inward of the third web non-marginal registry holes 76. A longitudinal, second non-marginal line of perforations 80 is transversely inward of the first non-marginal perforations 78. A longitudinal, third non-marginal line of perforations 82 is transversely outward of the second, second web marginal edge 52. A longitudinal, fourth non-marginal line of perforations 83 is transversely inward of the edge 52.

Longitudinally spaced, transverse die cuts 84 extend transversely between and slightly outward beyond the third web marginal perforations 70 and the third web, third non-marginal perforations 82. The die cuts 84 are superimposed over portions of the first and second web transverse perforations 24. The transverse lines of perforations 24 of the third web 16 extend between the third web marginal edges 58, 60 and the die cuts 84. The third web 16 forms the product packing slips between the second and fourth non-marginal perforations 80, 83 and the die cuts 84. The slips are superimposed over the second web packing slip envelope back panels.

A first set of longitudinal lines of adhesive join the third web back 86 to the second web face 88. A first such adhesive line 90 is between the third and fourth non-marginal perforations 82, 83. A second such adhesive line 92 is between the first marginal perforations 70 and the first non-marginal perforations 78.

The longitudinally continuous fourth web 18 is superimposed over the third web 16. The web 18 has transversely separated, marginal edges 94, 96, and a transverse width substantially equal to the fist web width. A longitudinal row of registry holes 98 is along the first, fourth web marginal edge 94 and superimposed on the non-marginal registry holes 76 of the third web and the first and second web registry holes 46, 54. A longitudinal, marginal line of perforations 100 is transversely inward of the fourth web registry holes 98 and superimposed on the first non-marginal perforations 78 of the third web 16. A longitudinally extending, non-marginal line of perforations 102 is transversely inward of the fourth web marginal perforations 100 and of the second non-marginal perforations 80 of the third web 16. The fourth web 18 forms product packing slip envelope front panels superimposed over the third web packing slips and the second web packing slip back panels.

A second set of longitudinal and longitudinally spaced, transverse lines of adhesive joins the fourth web back 104 to the second and third web faces 88, 106. A first such longitudinal line 108 is transversely outward of the first non-marginal perforations 78 of the third web 16. A second such longitudinal adhesive line 110 is transversely between the first and second non-marginal perforations 78, 80 of the third web 16. A third such longitudinal adhesive line 109 is transversely between the third and fourth non-marginal perforations 82, 83 of the third web 16 and transversely inward of the adjacent edge 52 of the [fourth web 18.] *second web 14.* A series of transverse adhesive lines 112, 114 are longitudinally adjacent in both longitudinal directions the transverse perforations 24 of the second and fourth webs 14, 18 in the area of the die cuts 84.

The fifth web 20 is longitudinally continuous and superimposed over the fourth web 18. It has transversely separated, longitudinal, marginal edges 116, 118, and a transverse width substantially equal to the third web width. Longitudinal, marginal, removable, feed strips 120, 122 are along the fifth web marginal edges 116, 118, respectively. The strips 120, 122 include longitudinal, marginal rows of feed holes 124, 126, respectively, superimposed on the third web marginal feed holes 66, 68, and longitudinal, marginal lines of perforations 128, 130 transversely inward of the fifth web feed holes 124, 126. The first of the fifth web marginal lines of perforation 128, 130 is superimposed on the first of the third web marginal perforations [66, 68.] *70, 72.* A longitudinal, non-marginal registry strip 132 is transversely inward of the fifth web first marginal perforations 128. The strip 132 includes a longitudinal, non-marginal row of registry holes 134 superimposed on the fourth web non-marginal registry holes 98, and a longitudinal, first non-marginal line of perforations 136 transversely inward of the fifth web non-marginal registry holes 134, and superimposed on the first [non-] marginal perforations 100 of the fourth web 18. A second non-marginal line of perforations 137 is superimposed on the fourth non-marginal line of perforations 83 of the third web 16. The fifth web 20 forms record panels 138, 140 of the packing slips of the third web 16. The panels 138 are superimposed over the fourth web packing slip front panels, the third web packing slips and the second web packing slip back panels.

A third set of longitudinal lines of adhesive join the back 143 of the fifth web 20 to the face 106 of the third web 16. Two such adhesive lines 142, 144 are in the area of the marginal feed holes 66, 68 of the third web 16. The preferred assembly 10 is used by imprinting and removal of form units 21 from a printer, in series or singly. If desired, feed strips 62, 64, 120, 122 of a form unit 21 may be left in the tractors of the printer, to feed the remainder of the assembly 10. If not, they may be removed.

Referring to FIG. 1, the record panels 138, 140 are removed, and filed or otherwise used as desired. The strip of the third web between perforation lines 72, 82 may also be removed.

The remainder of the form unit 21 is filled, packing slip envelope assembly. This assembly is used by removal of sheet 26 to expose the adhesive on the back 56 of the assembly, and placement of the assembly on a product.

Upon arrival of the product at its destination, the envelope assembly is opened and the product packing slip removed. The strip 145 of the fourth sheet 32, which is between the perforation lines 100, 102 may be torn from the assembly. Because of adhesive line 110, removal of the strip 145 causes removal of the underlying strip 147, and perforation of the perforation lines 78, 80.

To facilitate removal of the strips 145, 147, the first and second webs 12, 14 may include punches 149 along the transverse perforation lines 24 inward of the registry line 54, such that in the assembly 10, the punches 149 underlie the strips 145, 147. The punching facilitates grasping of the strips 145, 147.

With the edge portion of the strips 145, 147 removed, packing slip between the perforation lines 102, 80 is exposed to view. This edge may be grasped and the packing slip snapped free along perforation line 83.

Figure 5:
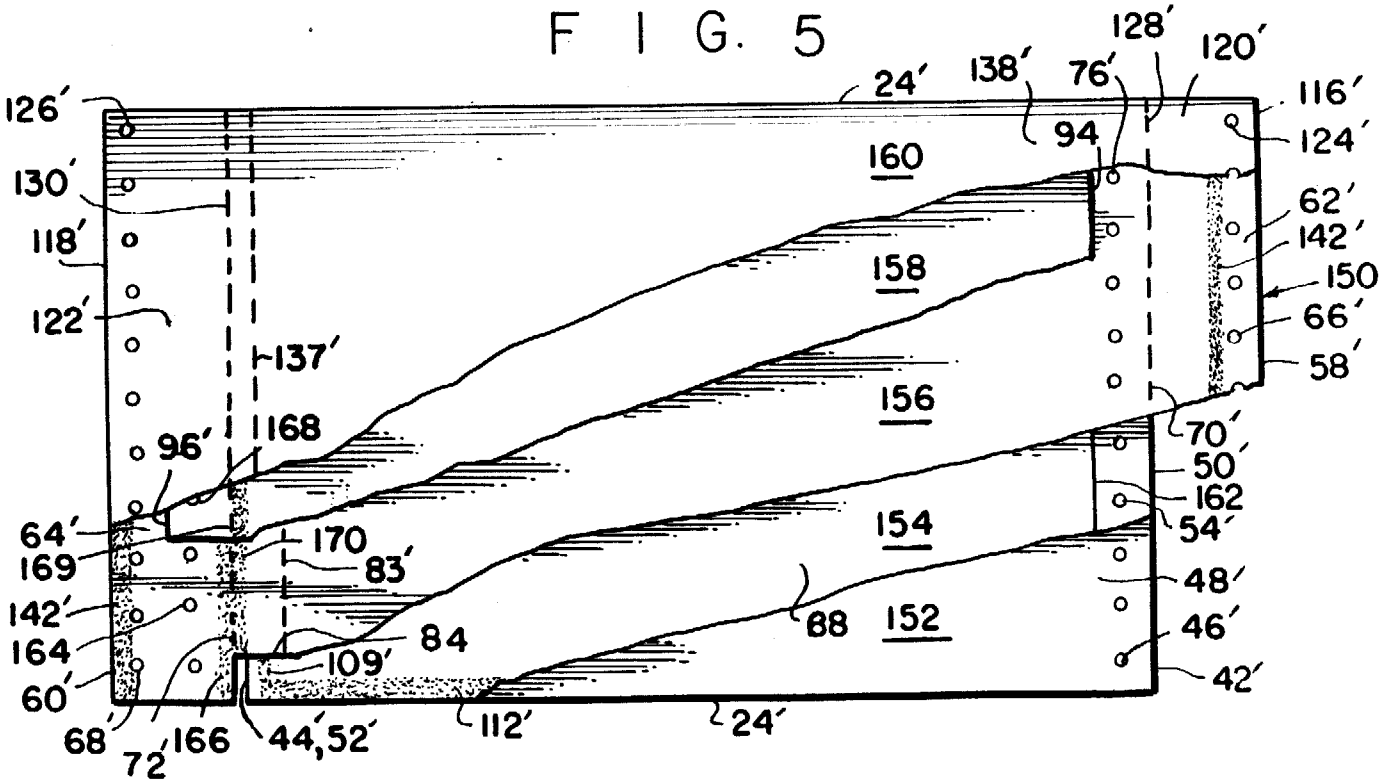
FIG. 5 is a cut-away view similar to FIG. 1, of a second preferred form assembly.

The second preferred form assembly provides form units 150 as in FIG. 5. First, second, third, fourth and fifth sheets 152, 154, 156, 158, 160 are formed of first through fifth webs (not shown). The first and second sheets 152, 154 of the unit 150 are identical, respectively, to the first and second sheets 26, 28 of the unit 20, with the exception of the absence of the punches 149 and the presence of a longitudinal cut line [102 transversely inward of the feed holes 54] *49.* Adhesive line 92 is excluded. The third sheet 156 varies from the third sheet 30 to exclude elements 78, 80, 82, 108, 110, 147 and include a second non-marginal line of registry holes 164. Adhesive [lines 108, 112 are] *line 108 is* excluded. The marginal edge 94 of the fourth sheet 158 terminates where perforation line 100 exists on fourth sheet 32, and the edge 96 extends across the feed holes 164. The fourth sheet 158 includes registry holes 168 superimposed on registry holes 164, and marginal perforation line 169 superimposed on perforation line 72. An adhesive line 166 between the registry hole lines 164, 168 and the perforation lines 72, 169 joins the sheets 156, 158. The fifth sheet 160 excludes elements 132, 134, 136, 140. An adhesive line 170 is superimposed on the adhesive line 109 and joins the sheets 158, 160.

The unit 150 is used like the unit 21. Notably, the strips 145, 147 and punches 149 are absent. With the sheet 160 removed, the portion of the sheet 156 between the edges 94 of the sheet 158 and the perforation line 70 of the sheet 156 is exposed to view and not attached to sheet 158 or sheet 154. Thus, the envelope assembly of the unit 150 thus forms an open, not closed, envelope.

The preferred embodiments of the invention are now described. To particularly point out and distinctly claim the subject matter regarded as invention, the following claims conclude this specification.

What is claimed is:

1. An improved, continuous business *envelop* form assembly [providing product packing slips in adhesive-backed envelopes, and corresponding records of the packing slips, adapted to be fed through automatic printing means for simultaneous printing of the packing slips of the envelopes, and the corresponding records], comprising:

a longitudinally continuous back web having *first and second* opposed marginal edges, a transverse width, a marginal row of registry holes along [a] *the* first of the marginal edges, a front, and longitudinally spaced, transverse lines of perforations extending between the marginal edges, the web forming [product packing slip] envelope back panels;

a longitudinally continuous insert web superimposed over the back web, having opposed *first and second* marginal edges outward of the corresponding back web *first and second* marginal edges, a transverse width substantially greater than the back web width, *a first* marginal feed [strips] *strip* along the insert web *first* marginal [edges] *edge* including *a first* marginal [rows] *row* of feed holes along the insert web *first* marginal [edges] *edge, a second marginal feed strip along the insert web second marginal edge including a second marginal row of feed holes along the insert web second marginal edge,* [and] *a first* marginal [lines] *line* of perforations transversely inward of the insert web *first* marginal feed holes, *and a second marginal line of perforations transversely inward of the insert web second marginal feed holes,* a non-marginal registry strip transversely inward of [a] *the* first of the insert web marginal feed strips including a non-marginal row of registry holes superimposed on the back web registry holes, and a longitudinal, first non-marginal line of perforations transversely inward of the insert web non-marginal registry holes and [one] *the first* of the back web marginal edges, a longitudinal, second non-marginal line of perforations transversely inward of the first non-marginal *lines of* perforations, a longitudinal, third non-marginal line of perforations transversely outward of the second of the back web marginal edges, a longitudinal, fourth non-marginal line of perforations transversely inward of the second, back web marginal edge, longitudinally spaced, transverse die cuts extending between the first *of the* insert web marginal *lines of* perforations and the third non-marginal *line of* perforations, and superimposed over portions of the back web transverse *lines of* perforations, longitudinally spaced, transverse lines of perforations between the insert web marginal edges and the die cuts superimposed on portions of the back web transverse *line of* perforations, a face and a back, the insert web forming [product] packing slips between the insert web second and [third] *fourth* non-marginal *line of* perforations and the die cuts, the *packing* slips superimposed over the back web [packing slip] envelope back panels;

a first set of [longitudinal] lines of adhesive, *the first set* joining the insert web back to the back web face, one such adhesive line *extending longitudinally and* being transversely inward of the third non-marginal *line of* perforations *of the insert web* and another such adhesive line *extending longitudinally and* being between the first *of the* marginal *lines of* perforations and the first non-marginal *line of* perforations *of the insert web;* a longitudinally continuous front web superimposed over the insert web, having *first and second* opposed marginal edges, a transverse width substantially equal to the back web width, a marginal row of registry holes along [one] *the first* of the front web marginal edges, superimposed on the insert web non-marginal registry holes and the back web registry holes, a marginal line of perforations transversely inward of the front web *marginal* registry holes and [transversely outward of] *superimposed on* the first non-marginal *line of* perforations *of the insert web,* a longitudinally extending, non-marginal line of perforations transversely inward of the front web marginal *line of* perforations and transversely inward of the second non-marginal *line of* perforations of the insert web, a face, a back, longitudinally spaced, transverse lines of perforations superimposed over the back web and insert web transverse *lines of* perforations, the front web forming [product packing slip] envelope front panels superimposed over the insert web [packing slips] and the back web [packing slip] back panels; [and]

a second set of [longitudinal and longitudinally spaced, transverse] lines of adhesive , *the second set* joining the front web back to the insert [and back] web [faces] *face,* one such [longitudinal] *adhesive* line *extending longitudinally and* being transversely outward of the insert web first non-marginal *line of* perforations, [another] *a second* of such [*longitudinal*] *adhesive lines extending longitudinally and* being transversely between the insert web first and second non-marginal *lines of* perforations, and a third such [longitudinal] adhesive line *extending longitudinally and* being transversely between the insert web third and fourth non-marginal *lines of* perforations[,]; *and* [the transverse adhesive lines being longitudinally adjacent in both longitudinal directions the transverse perforations of the back and front webs in the area of the die cuts.]

*a third set of lines of adhesive, the third set joining the front web back to the back web face, one such adhesive line extending transversely adjacent one side of the transverse line of perforations in the area of the die cut and another such adhesive line extending transversely adjacent to the other side of the transverse line of perforations in the area of the die cuts.*

2. An improved, continuous business *envelop* form [assembly providing product packing slips in adhesive-backed envelopes, and corresponding records of the packing slips, adapted to be fed through automatic printing means for simultaneous printing of the packing slips, the envelopes, and the corresponding records], comprising:

a first web being continuous in a longitudinal direction, having *first and second* opposed, longitudinal, marginal edges, a transverse first web width, a longitudinal row of registry holes along [a] *the* first of the marginal edges, a face, an adhesive release material coating at least a portion of the face, and longitudinally spaced, transverse lines of perforations extending between the marginal edges;

a longitudinally continuous second web superimposed over the first web, having *first and second* opposed, longitudinal, marginal edges superimposed on the first web *first and second* marginal edges, a transverse width substantially equal to the first web width, a longitudinal row of registry holes along [a] *the* first of the second web marginal edges superimposed on the first web registry holes, a front, a back, an adhesive material coating at least a portion of the second web back superimposed on the first web adhesive release material, and longitudinally spaced, transverse lines of perforations extending between the marginal edges of the second web and superimposed on the first web transverse *line of* perforations, the second web forming [product packing slip] envelope back panels;

a longitudinally continuous third web superimposed over the second web, having *first and second* opposed, longitudinal, marginal edges outward of the first *web* and second web marginal edges, a transverse third web width substantially greater than the first web width, *a first* longitudinal, marginal, removable, feed [strips] *strip* along the third web *first* marginal [edges] *edge* including *a first* longitudinal, marginal [rows] *row* of feed holes along the third web *first* marginal [edges] *edge, a second longitudinal, marginal, removeable, feed strip along the third web second marginal edge including a second longitudinal, marginal row of feed holes along the third web second marginal edge,* [and] *a first* longitudinal, marginal [lines] *line* of perforations transversely inward of the third web *first* marginal *row of* feed holes, *a second longitudinal marginal line of perforation transversely inward of the third web second marginal row of feed holes,* a longitudinal, non-marginal, registry strip transversely inward of [a] *the* first of the third web marginal feed strips including a longitudinal, non-marginal, row of registry holes superimposed on the first *web* and second web *rows of* registry holes, and a longitudinal, first non-marginal line of perforations transversely inward of the third web non-marginal *row of* registry holes and [a] *the* first of the second web marginal edges, a longitudinal, second non-marginal line of perforations transversely inward of the first non-marginal *line of* perforations, a longitudinal, third non-marginal line of perforations transversely [inward] *outward* of the second *edge* of the second web marginal edges, a longitudinal, fourth non-marginal line of perforations transversely inward of the third non-marginal line of perforations, longitudinally spaced, transverse die cuts extending between the first, third web marginal *line of* perforations and the third, third web non-marginal *line of* perforations and superimposed over portions of the first *web* and second web transverse *lines of* perforations, longitudinally spaced, transverse lines of perforations between the third web marginal edges and the die cuts superimposed on portions of the first and second web transverse *lines of* perforations, a face and a back, the third web forming [product] packing slips between the second and [third] *fourth* non-marginal *line of* perforations and the die cuts, the *packing* slips superimposed over the second web [packing slip] envelope back panels;

a first set of [longitudinal lines] adhesive *lines, the first set* joining the third web back to the second web face, one such adhesive line *extending longitudinally and* being between the third and fourth non-marginal *lines of* perforations and another such adhesive line *extending longitudinally and* being between the first marginal *line of* perforations and the first non-marginal *line of* perforations;

a longitudinally continuous fourth web superimposed over the third web, having *first and second* transversely separated, longitudinal, marginal edges, a transverse width substantially equal to the first web width, a longitudinal row of registry holes along [one] *the first* of the fourth web marginal edges superimposed on the third web non-marginal *row of* feed holes and the first *web* and second web *rows of* registry holes, a longitudinal marginal line of perforations transversely inward of the fourth web *row of* registry holes and [transversely outward of] *superimposed on* the first non-marginal *line of* perforations *of the third web,* a longitudinally extending, non-marginal line of perforations transversely inward of the fourth web marginal *line of* perforations and transversely [outward] *inward* of the second non-marginal *line of* perforations of the third web, a face, a back, longitudinally spaced, transverse lines of perforations superimposed on the first, second, and third web transverse *lines of* perforations, the fourth web forming [product packing slip] envelope front panels superimposed over the third web [packing slips] and the second web [packing slip] back panels;

a second set of [longitudinal and longitudinally spaced, transverse] lines of adhesive, *the second set* joining the fourth web back to the [second and] third web [faces] *face,* one such [longitudinal] *adhesive* line *extending longitudinally and* being transversely outward of the first non-marginal *line of* perforations of the third web, [another] *a second* of such longitudinal adhesive [lines] *line extending longitudinally and* being transversely between the first and second non-marginal *lines of* perforations of the third web, and a third such [longitudinal] adhesive line *extending longitudinally and* being transversely between the third and fourth non-marginal *lines of* perforations of the third web[,]*; and* [the transverse adhesive lines being longitudinally adjacent in both longitudinal directions the transverse perforations of the second and fourth webs in the area of the die cuts;]

*a third set of lines of adhesive, the third set joining the fourth web back to the second web face, one such adhesive line extending transversely adjacent one side of the transverse line of perforations in the area of the die cut and another such adhesive line extending transversely adjacent to the other side of the transverse line of perforations in the area of the die cuts;* a longitudinally continuous fifth web superimposed over the fourth web having *first and second* transversely separated, longitudinal, marginal edges, a transverse width substantially equal to the third web width, *first and second* longitudinal, marginal, removable, feed strips along the fifth web *first and second* marginal edges including longitudinal, *first and second* marginal rows of feed holes superimposed on the third web *first and second* marginal *rows of* feed holes, longitudinal, *first and second* marginal lines of perforations transversely inward of the fifth web *rows of* feed holes, [a] *the* first of the fifth web marginal lines of perforation being superimposed on the first of the third web marginal *line of* perforations, a longitudinal, non-marginal registry strip transversely inward of the fifth web first marginal *line of* perforations including a longitudinal, non-marginal row of registry holes superimposed on the third web non-marginal *row of* registry holes, a longitudinal, first non-marginal line of perforations transversely inward of the fifth web non-marginal *row of* registry holes, and a second non-marginal line of perforations superimposed on the [first] *fourth* mon-marginal *line of* perforations of the [fourth] *third* web, and longitudinally spaced, transverse lines of perforations superimposed on the first, second, third and fourth web transverse *lines of* perforations[, the fifth web forming records of the packing slips of the third web superimposed over the fourth web packing slip front panels, the third web packing slips and the second web packing slip back panels]; and a [third] *fourth* set of longitudinal lines of adhesive joining the back of the fifth web to the faces of third and fourth webs, two such adhesive lines being in the area of the marginal *rows of* feed holes of the third web.

3. An improved, continuous business *envelope* form assembly [providing product packing slips in adhesive-backed envelopes, and corresponding records of the packing slips, adapted to be fed through automatic printing means for simultaneous printing of the packing slips, the envelopes, and the corresponding records], comprising:

a first web being continuous in a longitudinal direction, having opposed, longitudinal, marginal edges, a transverse first web width, a longitudinal row of registry holes along a first of the marginal edges, a face, an adhesive release material coating at least at portion of the face, and longitudinally spaced, transverse lines of perforations extending between the marginal edges;

a longitudinally continuous second web superimposed over the first web, having opposed, longitudinal, marginal edge superimposed on the first web marginal edges, a transverse width substantially equal to the first web width, a longitudinal row of registry holes along a first of the second web marginal edges superimposed on the fist web registry holes, a front, a back, an adhesive material coating at least a portion of the second web back superimposed on the first web adhesive release material, and longitudinally spaced, transverse lines of perforations extending between the marginal edges of the second web and superimposed on the first web transverse *lines of* perforations, the second web forming [product packing slip envelope] back panels;

a longitudinally continuous third web superimposed over the second web, having opposed, longitudinal, marginal edges outward of the first and second web marginal edges, a transverse third web width substantially greater than the first web width, *first and second* longitudinal, marginal, removable, feed strips along the third web marginal edges including *first and second* longitudinal, marginal rows of feed holes along the third web *first and second* marginal edges and *first and second* longitudinal, marginal lines of perforations transversely inward of the third web *first and second* marginal *row of* feed holes, [a longitudinal, non-marginal, registry strip transversely inward of a first of the third web marginal feed strips including] a longitudinal, non-marginal, first row of registry holes superimposed on the first and second web *rows of* registry holes, a longitudinal, non-marginal, second row of registry holes in [a] *the* second of the third web marginal feed strips, a longitudinal, [second] *first* non-marginal, line of perforations transversely inward of the second of the second web marginal edges, longitudinally spaced, transverse die cuts extending between the first and second third web marginal *lines of* perforations and superimposed over portions of the first and second web transverse *lines of* perforations, longitudinally spaced, transverse lines of perforations between the third web marginal edges and the die cuts superimposed on portions of the first and second web transverse *lines of* perforations, a face and a back, the third web forming [product] packing slips between the first marginal *line of* perforations, the second non-marginal *line of* perforations and the die cuts, the slips superimposed over the second web [packing slip envelope]back panels;

a first set of *one* longitudinal lines] *line* of adhesive joining the third web back to the second web face, *the* one [such] adhesive line being between the second marginal *line of* perforations and the [second] *first* non-marginal *line of* perforations;

a longitudinally continuous fourth web superimposed over the third web, having transversely separated, longitudinal, first and second marginal edges, a transverse width substantially equal to the first web width, a longitudinal row of registry holes along the second of the fourth web marginal edges, a longitudinal marginal line of perforations transversely inward of the fourth web *row of* registry holes and superimposed on the second [non-] marginal *line of* perforations of the third web, a face, a back, longitudinally spaced, transverse lines of perforations superimposed on the first, second and third web transverse *lines of* perforations, the fourth web forming [product packing slip envelope] front panels superimposed over the third web [packing slips] and the second web packing slip back panels;

a second set of [longitudinal and longitudinally spaced, transverse] lines of adhesive joining the fourth web back to the second and third web faces, one such longitudinal line being transversely outward of the [second] *first non-marginal line of* perforations of the third web, [another] *a second* of such longitudinal adhesive lines being transversely inward of the second marginal *line of* perforations of the [third] *fourth* web, [the transverse adhesive lines being] *a third and a fourth line of adhesive extending transversely and being* longitudinally adjacent in both longitudinal directions *to* the transverse *lines of* perforations of the second and fourth webs in the area of the die cuts;

a longitudinally continuous fifth web superimposed over the fourth web having transversely separated, *first and second* longitudinal, marginal edges, a transverse width substantially equal to the third web width, *first and second* longitudinal, marginal, removable, feed strips along the fifth web marginal edges including longitudinal, *first and second* marginal rows of feed holes superimposed on the third web marginal *rows of* feed holes, *first and second* longitudinal, marginal lines of perforations transversely inward of the fifth web *rows of* feed holes and superimposed on the third web *first and second* marginal perforations, and longitudinally spaced, transverse lines of perforations superimposed on the first, second, third and fourth web transverse *lines of* perforations, the fifth web [forming records of the packing slips of the third web] superimposed over the fourth web packing slip front panels, the third web packing slips and the second web [packing slip] back panels; and a third set [of longitudinal] lines of adhesive joining the back of the fifth web to the faces of the third and fourth webs, two such adhesive lines *extending longitudinally and* being in the area of the marginal feed holes of the third web.

*4. An improved, continuous business envelop form, comprising:*

*a longitudinally continuous first web having opposed first and second marginal edges, a front, a transverse width, at least one row of holes transversely inward of a first of said marginal edges thereof, and longitudinally spaced, transverse lines of perforations extending between said marginal edges;* another longitudinally continuous web having opposed first and second marginal edges, a front, a transverse width, a row of holes transversely inward of the first of said marginal edges thereof, a first line of perforations transversely inward of said row of holes, and a second line of perforations transversely inward of said first line of perforations, and longitudinally spaced, transverse lines of perforations extending between said marginal edges thereof and in substantial registration with said transverse lines of perforations extending between said marginal edges of said first-mentioned web;

*a third web having opposed marginal edges, a transverse width, at least one row of holes transversely inward of a first of said marginal edges thereof, a line of perforations transversely inward of said row of holes, said third longitudinal web disposed between said first-mentioned web and said second-mentioned web with said at least one row of holes of said third web in registration with said at least one row of holes transversely inward of said first marginal edge of said first-mentioned web, longitudinally spaced transverse die cuts extending from said third web marginal line of perforations and superimposed over portions of said first-mentioned web transverse lines of perforations;*

*first means for adhesively connecting said first-mentioned web and said second-mentioned web along a marginal area of the first marginal edge of said first-mentioned web;*

*second means for adhesively connecting said first-mentioned web along a marginal area of its other marginal edge to said second-mentioned web;*

*third means for adhesively connecting said first-mentioned web and said second-mentioned web along said longitudinally spaced, transverse lines of perforations in the areas of said die cuts; and*

*a fourth longitudinally continuous web disposed on the front of said second-mentioned web and having opposed first and second marginal edges, a transverse width greater than that of at least said first-mentioned web, a row of holes transversely inward of said first marginal edge thereof, said row of holes superimposed on said row of holes of said second-mentioned web, and a line of perforations transversely inward of said row of holes.*

*5. The improved continuous business envelope form assembly of claim 4, wherein:*

*said line of perforations of said fourth-mentioned web transversely inward of said row of holes are superimposed on said first line of perforations of said second-mentioned web.*

*6. The improved, continuous business envelope form assembly of claim 4, further comprising:*

*an adhesive material coating on the back of said first-mentioned web.*

*7. The improved, continuous business envelope form assembly of claim 6, further comprising:*

*a fifth longitudinally continuous web having opposed marginal edges, a transverse width, and a line of holes transversely inward of a first of said marginal edges thereof, said fifth web releasably attached to said adhesive coating of said first-mentioned web.*

* * * * *